Oct. 17, 1939.　　　　A. LANDY　　　2,176,404
TOOL
Filed Feb. 21, 1939　　　3 Sheets-Sheet 3
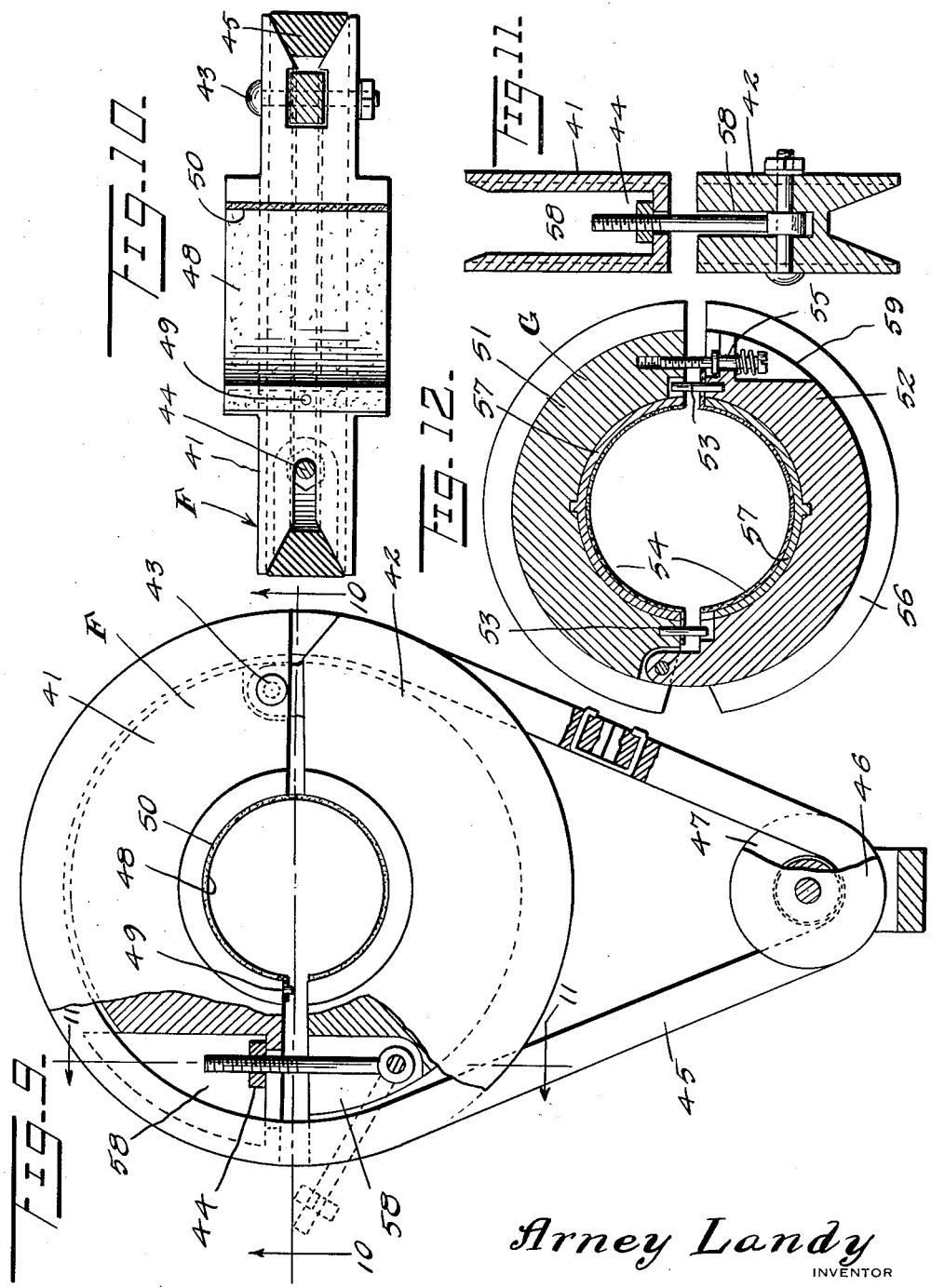
Arney Landy
INVENTOR
BY Victor J. Evans & Co.
ATTORNEYS Patented Oct. 17, 1939

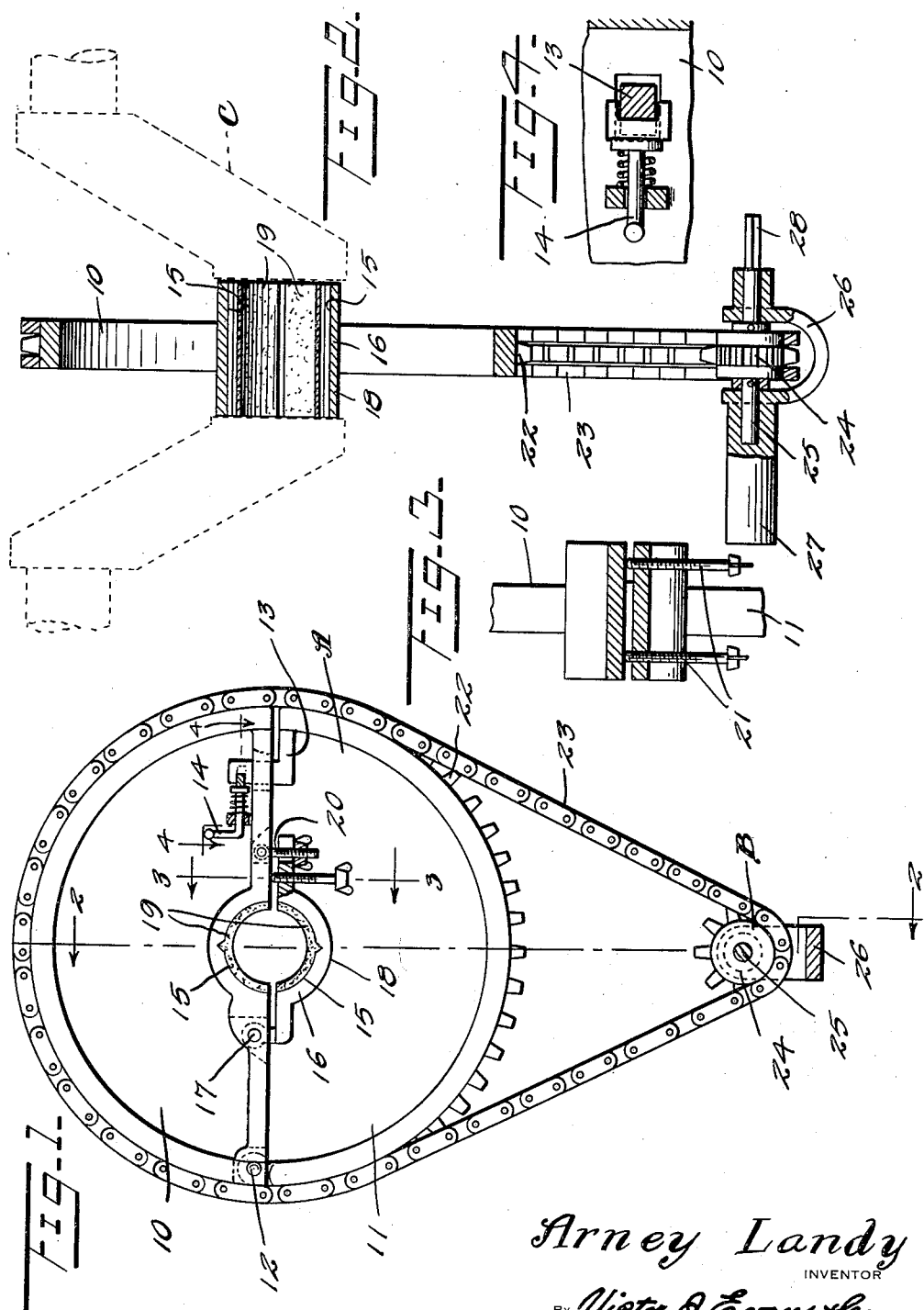

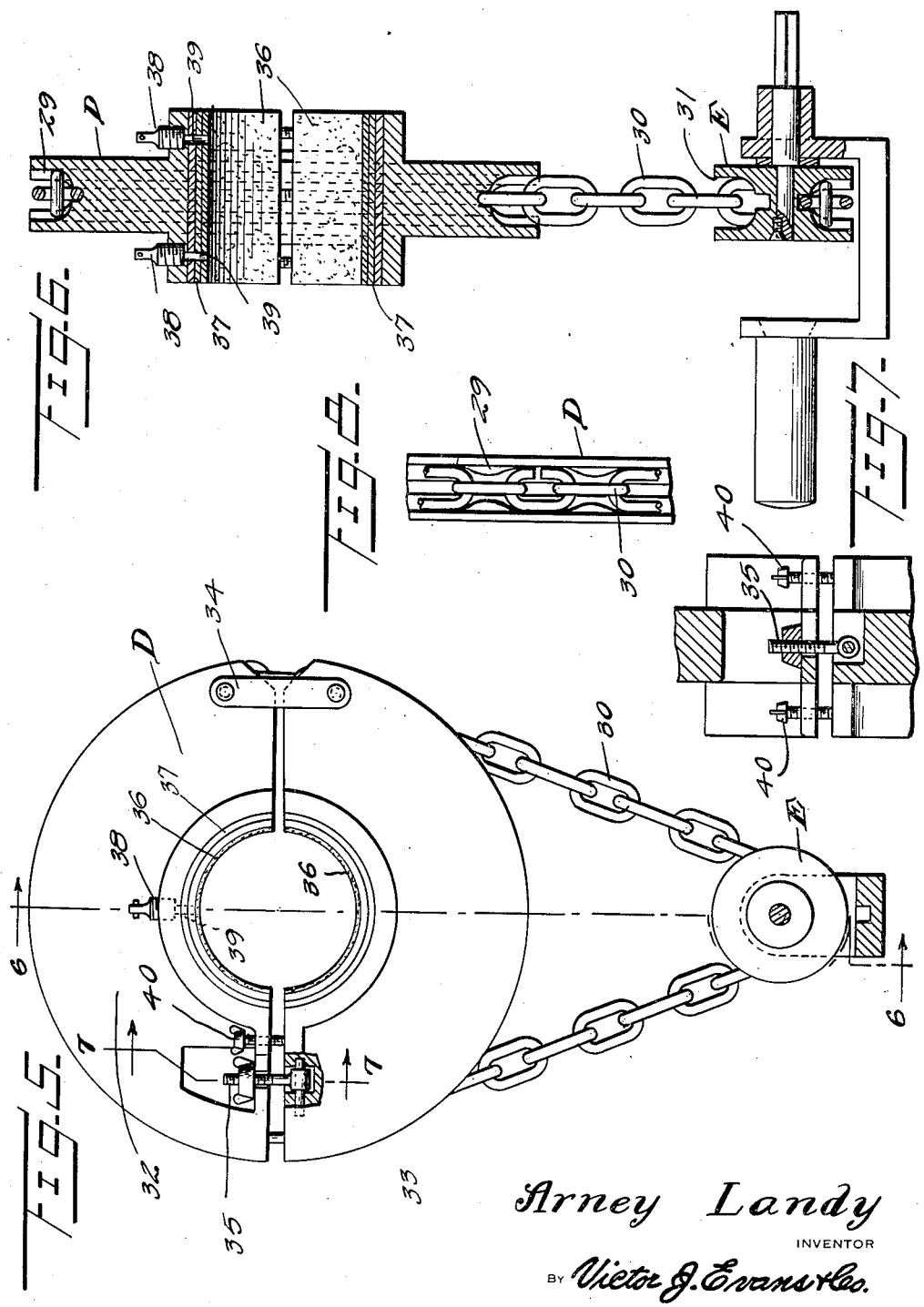

2,176,404

UNITED STATES PATENT OFFICE 2,176,404

TOOL

Arney Landy, Deer River, Minn.

Application February 21, 1939, Serial No. 257,757

2 Claims. (Cl. 51—73)

The invention relates to a tool and more especially to a grinding or truing tool or device.

The primary object of the invention is the provision of a tool or device of this character, wherein a shaft within the setup of machinery, particularly crank shafts for engines, can be accurately ground or trued in the use of said tool or device, especially where the shaft has become slightly flattened or scored in use, without necessitating the removal of the shaft in its setup.

Another object of the invention is the provision of a tool or device of this character, wherein the grinding unit can be directly positioned around the portion of the shaft to be trued or ground.

A further object of the invention is the provision of a tool or device of this character, wherein the grinding unit is sectional, these being adjustable relative to each other whereby grinding elements of different degrees of coarseness can be slipped into place and the unit properly and conveniently applied to a shaft for the grinding thereof without its removal from the setup position of the same.

A still further object of the invention is the provision of a tool or device of this character, wherein the driving power can be transferred to the grinding unit in a convenient and easy manner, the driving power being either of hand or motor character.

A still further object of the invention is the provision of a tool or device of this character, wherein the same is susceptible of adjustment to vary the grinding action thereof when in use.

A still further object of the invention is the provision of a tool or device of this character, which is simple in its construction, thoroughly reliable and efficient in operation, easy of application and removal to and from work, easily operated, and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is an elevation partly in section of a tool or device constructed in accordance with the invention.

Figure 2 is a sectional view taken on the line 2—2 of Figure 1 looking in the direction of the arrows and applied to a crank pin of a crank shaft for an internal combustion engine.

Figure 3 is a fragmentary sectional view taken on the line 3—3 of Figure 1 looking in the direction of the arrows.

Figure 4 is a fragmentary sectional view taken on the line 4—4 of Figure 1 looking in the direction of the arrows.

Figure 5 is a view similar to Figure 1 showing a slight modification.

Figure 6 is a sectional view taken on the line 6—6 of Figure 5 looking in the direction of the arrows.

Figure 7 is a sectional view taken on the line 7—7 of Figure 5 looking in the direction of the arrows.

Figure 8 is a fragmentary edge elevation of the grinding unit.

Figure 9 is a view similar to Figure 5 showing a further modification of the invention.

Figure 10 is a sectional view taken on the line 10—10 of Figure 9 looking in the direction of the arrows.

Figure 11 is a sectional view taken on the line 11—11 of Figure 9 looking in the direction of the arrows.

Figure 12 is a vertical longitudinal sectional view through a further modified form of grinding unit.

Similar reference characters indicate corresponding parts throughout the several views in the drawings.

Referring to the drawings in detail, particularly Figures 1 to 4, inclusive, A designates generally the grinding unit, B the driver, respectively, while C denotes a portion of an engine crank shaft, the said unit and driver being the preferred setup of the device or tool in accordance with the invention and hereinafter described.

The unit A comprises a sectional ring-like rotatable member, the sections 10 and 11, respectively, of which are substantially half circular segments and hinged at 12 together so that the member can be disposed in encircling position about the pin of the crank shaft C while one section, preferably the section 11, is equipped with a keeper 13 engageable by a latch 14 on the other section, preferably the section 10, and in this manner these sections are separably latched together. On unlatching of the sections, they can be swung apart for the opening of the unit while on the swinging of the sections together the unit will be closed and latched.

Centrally of the sections 10 and 11 of the unit

A are provided encircling recesses 15, being diametrically opposed and one is constituted within the section 10 while the other is in a capping strap 16, hinged at 17 to the said section 10 and adapted for seating at 18 in the section 11 when the latter is in closing relation to the section 10. These recesses 15 have their faces covered with an abrasive lining 19 sectionaled corresponding to the recesses 15 and encircling the crank pin for grinding action thereon.

Built into the section 10 is an adjustable clamp 20 separably engageable with the strap 16 for the loose fastening of the same in closed relation to the section 10 while this strap also carries laterally spaced wing headed set screws 21 engageable with the section 10 so that the said strap 16 may be accurately adjusted to vary the grinding operation at either side of the vertical central axis of the unit A or for a uniform grinding action according to requirements in the operation of the tool or device. The lining 19 is the grinding element for the work to be operated upon. The unit A is rotated for grinding operation.

The unit A has at its periphery sprocket gear teeth 22 forming a sprocket gear for a sprocket chain 23 of endless type and this chain is operated by the driver B, which in this instance is in the form of a sprocket chain pinion 24, its journal 25 having bearing in a yoke 26 formed with a hand grip 27, the journal being also provided with a squared coupling end 28 with which is connected a power shaft (not shown). The grip 27 is grasped by a user of the tool or device and when power is transferred to the chain 23 it drives the unit A for grinding purposes hereinbefore set forth, the chain being trained about the said unit A for the driving thereof.

In Figures 5, 6, 7 and 8 of the drawings there is shown a modification of the invention wherein the periphery of the grinding unit D is formed with an annular link chain gripping channel or groove 29 accommodating an endless link chain 30 which is also engaged about the driver E peripherally grooved at 31 for gripping engagement of the chain 30 therewith.

The sections 32 and 33, respectively, of the unit D are connected by a pivotal link hinge 34 and are latched in closed relation to each other by the adjustable clamp 35. The abrasive lining 36 has association with shims 37 while built with the section 32 is a lubricant cup 38 having a passage or opening 39 for delivering lubricant onto a piece of work when being ground or trued so as to clear particles therefrom in the grinding. This cup 38 serves for the passage of kerosene or other suitable liquid onto the shaft constituting the work being ground to clean cuttings from the same.

The section 32 is equipped with set screws 40 functioning similar to the screws 21 hereinbefore described.

In Figures 9, 10 and 11 of the drawings there is shown a further modification of the invention wherein the grinding unit F includes the hinged sections 41 and 42, respectively, these being hinged at 43 and clamped in closed relation to each other by the adjustable clamp 44, the unit F being peripherally grooved for accommodating an endless belt 45, the driver 46 for said belt being also peripherally grooved at 47 for accommodating the said belt.

The abrasive element 48 is tacked in place at 49 in the recesses 50 provided for said lining.

In Figure 12 of the drawings there is shown a still further modification wherein the unit G having the hinged sections 51 and 52, respectively, is equipped with hinging pins 53 for the abrasive lining 54, the section 52 being equipped with a spring tensioned adjustable latching screw 55 engageable with the section 51 holding these sections in yieldable closed relation to each other. The unit G is peripherally grooved at 56 for a belt (not shown). The lining 54 is backed by shims 57 interlocked with the sections 51 and 52 of the unit G.

The clamp 44 is of adjustable type and is inset in clearances 58 therefor as provided in the sections 41 and 42 of the unit F while the screw 55 is inset in a clearance 59 therefor in the section 52 of the unit G.

The tool or device is readily placeable on the crank pin of a motor shaft without removal of said shaft from its setting, being only required to remove the oil pan from the engine and access to the said shaft is readily had. The device or tool can be positioned around the crank pin for truing the surface of the same without removal of such shaft as before stated. The grinding unit of the tool or device is rotated for grinding operation. The sections of the grinding unit can be adjusted to provide sufficient points of bearing on the surface of the shaft and thus successively following low or flat areas of the shaft with the result that these accentuated deformities be removed or remedied in the operation of the tool or device.

The driver for the grinding unit is dependently supported by the chain or belt and is manually held to maintain driving connections with the said unit in the working of the tool or device and in this manner the said driver is susceptible of being positioned to the proper degree for convenience in the handling of the tool or device resultant from the flexible suspension through the chain or belt connection between said driver and the unit. In other words, the driver can be disposed to either side of the vertical axis of the shaft or work acted upon by the grinder unit and manually shiftable in the locating of said driver.

What is claimed is:

1. In a tool of the kind described, a sectional wheel like rotatable grinding element having a central open circular hub portion, means arranged with the sections of said element for snugly retaining the hub portion in position around a part to be ground, grinding mediums fitting said hub portion for grinding action against said part, an endless flexible driving member interfitting the said element at the periphery thereof for imparting rotation thereto, a yoke, a pinion journaled in said yoke and having the flexible driving member trained thereover with the yoke suspended from the latter, a grip extending outwardly from the yoke at one side of the pinion, and a power journal fitting said yoke and the said pinion in alignment with the grip and having a flat faced terminal at the other side of the member opposite the grip for the attachment of a hand crank therewith.

2. In a tool of the kind described, a sectional wheel like rotatable grinding element having a central open circular hub portion, means arranged with the sections of said element for snugly retaining the hub portion in position around a part to be ground, grinding mediums fitting said hub portion for grinding action against said part, an endless flexible driving member interfitting the said element at the periphery thereof for imparting rotation thereto, a yoke, a pinion journaled in said yoke and having the flexible driving member trained thereover with the yoke suspended from the latter, a grip extending outwardly from the yoke at one side of the pinion, a power journal fitting said yoke and the said pinion in alignment with the grip and having a flat faced terminal at the other side of the member opposite the grip for the attachment of a hand crank therewith, and means connected with the sections of the said element for adjustment thereof in bearing the position of the sections of said element with relation to each other.

ARNEY LANDY.